(12) United States Patent
Im et al.

(10) Patent No.: US 11,822,178 B2
(45) Date of Patent: Nov. 21, 2023

(54) ARRAY SUBSTRATE, FABRICATION METHOD THEREOF, LIQUID CRYSTAL DISPLAY PANEL AND DISPLAY DEVICE

(71) Applicant: BOE Technology Group Co., Ltd., Beijing (CN)

(72) Inventors: Yunsik Im, Beijing (CN); Hyunsic Choi, Beijing (CN); Kai Hou, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 517 days.

(21) Appl. No.: 16/835,824

(22) Filed: Mar. 31, 2020

(65) Prior Publication Data

US 2021/0116744 A1 Apr. 22, 2021

(30) Foreign Application Priority Data

Oct. 17, 2019 (CN) .......................... 201910987115.7

(51) Int. Cl.
*G02F 1/1335* (2006.01)
*G02F 1/1362* (2006.01)

(52) U.S. Cl.
CPC .. *G02F 1/133528* (2013.01); *G02F 1/136286* (2013.01); *G02F 1/13625* (2021.01); *G02F 1/133548* (2021.01); *G02F 1/136295* (2021.01); *G02F 2201/121* (2013.01)

(58) Field of Classification Search
CPC ......... G02F 1/133528; G02F 1/136286; G02F 1/133548; G02F 1/13625; G02F 1/136295; G02F 2201/121; G02F 1/134309; G02F 1/1362; G02F 2201/40
See application file for complete search history.

(56) References Cited

U.S. PATENT DOCUMENTS

| 2009/0066885 | A1* | 3/2009 | Kumai ................. G02B 5/3058 427/163.1 |
| 2015/0029442 | A1 | 1/2015 | Koike et al. |
| 2015/0062500 | A1* | 3/2015 | Park .................. G02F 1/133536 359/485.05 |
| 2015/0212239 | A1* | 7/2015 | Park ..................... G02B 5/3058 216/24 |

(Continued)

FOREIGN PATENT DOCUMENTS

| CN | 103995405 A | 8/2014 |
| CN | 104330915 A | 2/2015 |

(Continued)

OTHER PUBLICATIONS

Office Action for corresponding Chinese Application No. 201910987115.7 dated Oct. 9, 2021.

*Primary Examiner* — Michael H Caley
*Assistant Examiner* — Agnes Dobrowolski
(74) *Attorney, Agent, or Firm* — ArentFox Schiff LLP; Michael Fainberg

(57) ABSTRACT

Disclosed are an array substrate, a fabrication method thereof, a liquid crystal display panel and a display device. The array substrate includes a substrate, a wire grid polarization layer located in an open region in a pixel region of the substrate and a transparent pattern located at the side, away from the substrate, of the wire grid polarization layer and consistent with a pattern of the wire grid polarization layer.

10 Claims, 9 Drawing Sheets

(56) References Cited

U.S. PATENT DOCUMENTS

| | | | | |
|---|---|---|---|---|
| 2015/0227251 A1* | 8/2015 | Zank | ...................... | G06F 3/0416 |
| | | | | 345/174 |
| 2016/0363812 A1* | 12/2016 | Li | ...................... | G02F 1/134363 |
| 2018/0260070 A1* | 9/2018 | Mun | ...................... | G06F 3/0416 |

FOREIGN PATENT DOCUMENTS

| CN | 106526735 A | * | 3/2017 | | |
| CN | 106526735 A | | 3/2017 | | |
| CN | 108287383 A | * | 7/2018 | ........... | G02B 5/3058 |
| CN | 108287383 A | | 7/2018 | | |
| CN | 108681138 A | | 10/2018 | | |

* cited by examiner

ARRAY SUBSTRATE, FABRICATION METHOD THEREOF, LIQUID CRYSTAL DISPLAY PANEL AND DISPLAY DEVICE

CROSS-REFERENCE TO RELATED APPLICATION

This application claims priority of Chinese Patent Application No. 201910987115.7, filed on Oct. 17, 2019, which is hereby incorporated by reference in its entirety.

FIELD

The present disclosure relates to the technical field of display, in particular to an array substrate, a fabrication method thereof, a liquid crystal display panel and a display device.

BACKGROUND

In recent years, a TFT-LCD (Thin Film Transistor-Liquid Crystal Display) has rapidly developed and held a dominant position in the current flat-panel display market due to the characteristics such as small size, low power consumption and no radiation. As a liquid crystal panel, a main structure of the TFT-LCD includes a backlight source as well as an array substrate and a color film substrate which are oppositely combined, and the space between the array substrate and the color film substrate is filled with liquid crystal molecules.

In order to reduce the fabrication process and the production cost, in related art, a WGP (Wire Grid Polarizer) is fabricated on the array substrate, and the WGP may be reused as a polarizer and a pixel electrode.

SUMMARY

The array substrate provided by some embodiments of the present disclosure includes a substrate, a wire grid polarization layer located in an open region in a pixel region of the substrate and a transparent pattern located at the side, away from the substrate, of the wire grid polarization layer and consistent with a pattern of the wire grid polarization layer.

In one possible implementation way, in the above-mentioned array substrate provided by some embodiments of the present disclosure, the wire grid polarization layer includes a plurality of metal wires, and slits are formed between the metal wires; and the array substrate further includes:

a transparent structure covering the slits, wherein the transparent structure and the transparent pattern are of an integrated structure arranged on the same layer.

In one possible implementation way, in the above-mentioned array substrate provided by some embodiments of the present disclosure, the wire grid polarization layer includes a plurality of metal wires, and slits are formed between the metal wires; and the array substrate further includes:

filler located in the slits, wherein the filler and the transparent pattern are of an integrated structure.

In one possible implementation way, in the above-mentioned array substrate provided by some embodiments of the present disclosure, the filler includes a first subsection in contact with the metal wire at one side of the slit where the filler is located, a second subsection in contact with the metal wire at the other side of the slit where the filler is located and a third subsection connecting the first subsection with the second subsection;

a gaps is formed between the first subsection and the second subsection; and the third subsection is in contact with the substrate.

In one possible implementation way, in the above-mentioned array substrate provided by some embodiments of the present disclosure, the slits are completely filled with the filler.

In one possible implementation way, the above-mentioned array substrate provided by some embodiments of the present disclosure further includes a silicon dioxide layer located between the metal wires and the transparent pattern; and an orthographic projection of the silicon dioxide layer on the substrate mutually overlaps with orthographic projections of the metal wires on the substrate.

In one possible implementation way, the above-mentioned array substrate provided by some embodiments of the present disclosure further includes a transistor located in a non-open region in the pixel region and an electrode structure located at the side, away from the wire grid polarization layer, of a layer where the transparent pattern is located;

the wire grid polarization layer is reused as a common electrode, and the electrode structure is a pixel electrode electrically connected with a drain electrode of the transistor;

or the wire grid polarization layer is reused as a pixel electrode and is electrically connected with the drain electrode of the transistor, and the electrode structure is a common electrode.

Based on the same inventive concept, an embodiment of the present disclosure further provides the fabrication method of the array substrate, including:

providing the substrate;

forming the wire grid polarization layer on a whole surface of the substrate;

forming the transparent pattern consistent with a pattern of the wire grid polarization layer on the wire grid polarization layer located in the open region in the pixel region of the substrate; and etching the wire grid polarization layer by taking the transparent pattern as a mask.

In one possible implementation way, in the above-mentioned fabrication method provided by some embodiments of the present disclosure, the wire grid polarization layer includes the plurality of metal wires, and the slits are formed between the metal wires; and when forming the transparent pattern consistent with the pattern of the wire grid polarization layer, the method further includes:

forming the transparent structure covering the slits, wherein the transparent structure and the transparent pattern are of the integrated structure arranged on the same layer.

In one possible implementation way, in the above-mentioned fabrication method provided by some embodiments of the present disclosure, forming the transparent structure covering the slits when forming the transparent pattern consistent with the pattern of the wire grid polarization layer specifically includes:

forming transparent material layers on a whole surface of the wire grid polarization layer;

coating the transparent material layers in the open region in the pixel region with a photoresist; and etching the transparent material layers by taking the photoresist as a mask to form the transparent pattern with an orthographic projection overlapping with the metal wires and the transparent structure covering the slits.

In one possible implementation way, in the above-mentioned fabrication method provided by some embodiments of the present disclosure, etching the transparent material layers by taking the photoresist as the mask includes:

etching the transparent material layers by taking the photoresist as the mask and adopting a dry etching process.

In one possible implementation way, in the above-mentioned fabrication method provided by some embodiments of the present disclosure, etching the wire grid polarization layer by taking the transparent pattern as the mask includes:

etching the wire grid polarization layer by taking the photoresist above the transparent pattern and the transparent structure as the mask.

In one possible implementation way, in the above-mentioned fabrication method provided by some embodiments of the present disclosure, after etching the wire grid polarization layer by taking the photoresist above the transparent pattern and the transparent structure as the mask, the method further includes: stripping the photoresist.

In one possible implementation way, in the above-mentioned fabrication method provided by some embodiments of the present disclosure, the wire grid polarization layer includes the plurality of metal wires, and the slits are formed between the metal wires, when forming the transparent pattern consistent with the pattern of the wire grid polarization layer, the method further includes:

forming the filler filling the slits, wherein the filler and the transparent pattern are of an integrated structure.

In one possible implementation way, in the above-mentioned fabrication method provided by some embodiments of the present disclosure, forming the filler filling the slits while forming the transparent pattern consistent with the pattern of the wire grid polarization layer includes:

forming the transparent material layers covering the metal wires, wherein gaps are formed between the transparent material layers in the same slit or the transparent material layers in the same slit are in contact with each other;

coating the transparent material layers in the open region in the pixel region with the photoresist; and etching the transparent material layers by taking the photoresist as the mask to form the transparent pattern with the orthographic projection overlapping the metal wires and the filler filling the slits, wherein the filler includes the first subsection in contact with the metal wire at one side of the slit where the filler is located, the second subsection in contact with the metal wire at the other side of the slit where the filler is located and the third subsection connecting the first subsection with the second subsection; a gap is formed between the first subsection and the second subsection; and the third subsection is in contact with the substrate; or the slits are completely filled with the filler.

In one possible implementation way, in the above-mentioned fabrication method provided by some embodiments of the present disclosure, etching the wire grid polarization layer by taking the transparent pattern as the mask includes:

etching the wire grid polarization layer by taking the transparent pattern and the filler as the mask.

In one possible implementation way, in the above-mentioned fabrication method provided by some embodiments of the present disclosure, before etching the wire grid polarization layer by taking the transparent pattern and the filler as the mask, the method further includes:

performing a stripping treatment on the photoresist; and
performing an annealing treatment on the transparent pattern and the filler.

In one possible implementation way, in the above-mentioned fabrication method provided by some embodiments of the present disclosure, etching the transparent material layers by taking the photoresist as the mask includes:

etching the transparent material layers by taking the photoresist as the mask and adopting a wet etching process.

Based on the same inventive concept, an embodiment of the present disclosure further provides the liquid crystal display panel including the array substrate and an opposite substrate arranged oppositely, wherein the array substrate is the above-mentioned array substrate provided by some embodiments of the present disclosure.

Based on the same inventive concept, an embodiment of the present disclosure further provides the display device including the above-mentioned liquid crystal display panel provided by some embodiments of the present disclosure.

DETAILED DESCRIPTION OF THE EMBODIMENTS

To make the objectives, technical solutions and advantages of the present disclosure clearer, the technical solutions of embodiments of the present disclosure are clearly and completely described below in combination with the accompanying drawings of the embodiments of the present disclosure. Obviously, the described embodiments are a part of embodiments of the present disclosure, not all the embodiments. Based the described embodiments of the present disclosure, all other embodiments obtained without creative work of those of ordinary skilled in the art fall within the protection scope of the present disclosure.

Unless otherwise defined, technical terms or scientific terms used herein shall be ordinary meanings as understood by those of ordinary skilled in the art in the field to which the present disclosure belongs. The words "first", "second" and similar terms used in the specification and claims of the present disclosure do not denote any order, quantity or importance, but are merely used to distinguish different components. The word "including" or "includes" or the like means that the element or item preceding the word covers the element or object listed after the word and its equivalent, without excluding other elements or objects. The words "inner", "outer", "upper", "lower" and the like are only used to denote a relative positional relation, and after an absolute position of a described object is changed, the relative positional relation may also be correspondingly changed.

Specific implementation ways of an array substrate, a fabrication method thereof, a liquid crystal display panel and a display device provided by embodiments of the present disclosure are described in detail below in combination with accompanying drawings. The thickness and shape of each film layer in the accompanying drawings are only intended to schematically describe the content of the present disclosure, rather than to reflect a true proportion.

Figure 1:
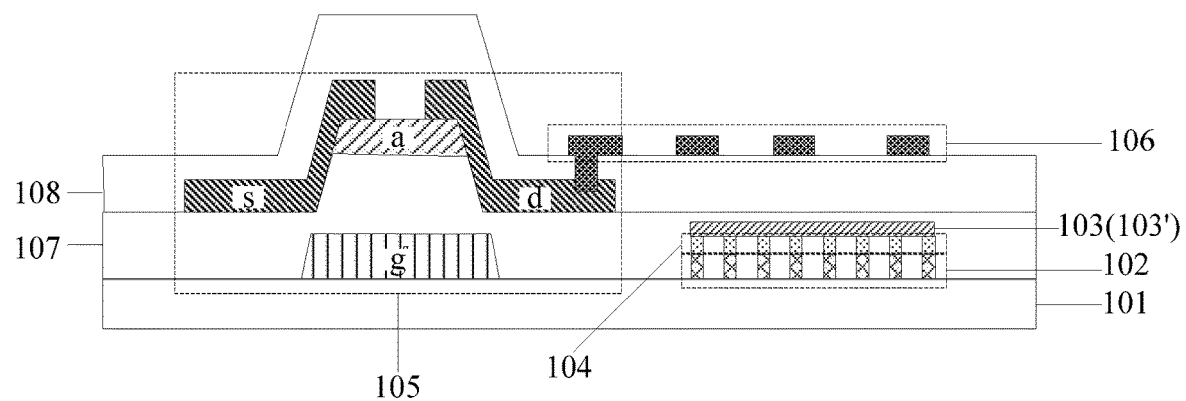
FIG. 1-FIG. 3 are respectively schematic structural diagrams of an array substrate provided by an embodiment of the present disclosure.
Figure 2:
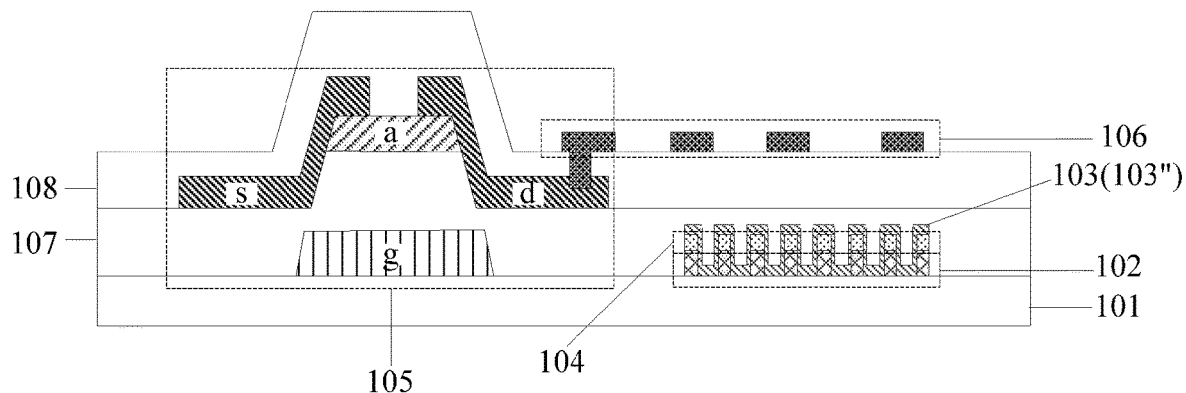
Figure 3:
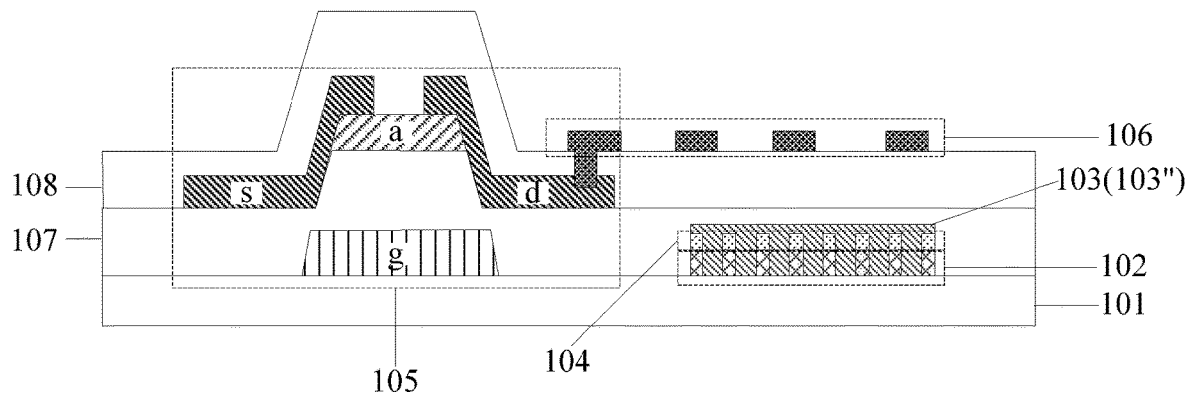

The array substrate provided by some embodiments of the present disclosure, as shown in FIG. 1 to FIG. 3, includes a substrate 101, a wire grid polarization layer 102 located in an open region (i.e., a region through which light can effectively pass) in a pixel region of the substrate 101 and a transparent pattern 103 located at the side, away from the substrate 101, of the wire grid polarization layer 102 and consistent with a pattern of the wire grid polarization layer 102.

The above-mentioned array substrate provided by some embodiments of the present disclosure includes the substrate 101, the wire grid polarization layer 102 located in the open region in the pixel region of the substrate 101 and the transparent pattern 103 located at the side, away from the substrate 101, of the wire grid polarization layer 102 and consistent with the pattern of the wire grid polarization layer 102. In an actual fabrication process, the wire grid polarization layer 102 may be firstly fabricated on a whole surface, the wire grid polarization layer 102 is masked by virtue of the transparent pattern 103, and the wire grid polarization layer 102 located in the open region in the pixel region is only retained, in this way, an align margin for performing an alignment process on the wire grid polarization layer is not required to be set, and therefore, the aperture rate of the liquid crystal display panel is increased.

In related art, the technical solution in which a WGP fabricated on a whole surface of the array substrate is used as a polarizer further exists. Due to the existence of the solution, capacitance is formed between the WGP and a signal line (such as a grid line and a data line) to result in delay of signals on the grid line and the data line. In the present disclosure, the wire grid polarization layer 102 is only arranged in the open region of the pixel region, and compared with those in the technical solution in which the WGP is fabricated on the whole surface in related art, the capacitance between the wire grid polarization layer 102 and the signal line is reduced, and the delay degree of the signal on the signal line is relieved.

Optionally, in the above-mentioned array substrate provided by some embodiments of the present disclosure, as shown in FIG. 1, the wire grid polarization layer 102 includes a plurality of metal wires electrically connected with each other, and slits are formed between the metal wires; and the array substrate further includes:

a transparent structure 103' covering the slits, wherein the transparent structure 103' and the transparent pattern 103 are of an integrated structure arranged on the same layer.

In other words, an orthographic projection of the transparent pattern 103 on the substrate 101 mutually overlaps with orthographic projections of the metal wires on the substrate 101, an orthographic projection of the transparent structure 103' on the substrate 101 mutually overlaps with orthographic projections of the slits on the substrate 101, namely the transparent pattern 103 and the transparent structure 103' are a transparent material layer located above the wire grid polarization layer 102. In a process of actually obtaining the wire grid polarization layer 102 in the open region in the pixel region, masking is performed by adopting the transparent material layer composed of the transparent pattern 103 and the transparent structure 103'.

Optionally, in the above-mentioned array substrate provided by some embodiments of the present disclosure, as shown in FIG. 2 and FIG. 3, the wire grid polarization layer 102 includes the plurality of metal wires electrically connected with each other, and the slits are formed between the metal wires; and the array substrate further includes:

filler 103" located in each of the slits, wherein the filler 103" and the transparent pattern 103 are of an integrated structure.

In other words, the orthographic projection of the transparent pattern 103 on the substrate 101 mutually overlaps with the orthographic projections of the metal wires on the substrate 101, and orthographic projections of the filler 103" on the substrate 101 are located in the orthographic projections of the slits on the substrate 101. In a process of actually obtaining the wire grid polarization layer 102 in the open region in the pixel region, masking is performed by adopting the integrated structure composed of the transparent pattern 103 and the filler 103".

In one possible implementation way, in the above-mentioned array substrate provided by some embodiments of the present disclosure, as shown in FIG. 2, each filler 103" includes a first subsection in contact with the metal wire at one side of the slit where the filler is located, a second subsection in contact with the metal wire at the other side of the slit where the filler is located and a third subsection connecting the first subsection with the second subsection;

gaps are formed between the first subsections and the second subsections; and the third subsections are in contact with the substrate.

In another possible implementation way, in the above-mentioned array substrate provided by some embodiments of the present disclosure, as shown in FIG. 3, the slits are completely filled with the filler.

It should be noted that, in the above-mentioned array substrate provided by some embodiments of the present disclosure, a light wave vector perpendicular to an extension direction of the slits in incident light is transmitted and a light wave vector parallel to the extension direction of the slits is absorbed or reflected to form polarized light under the condition that the widths of the slits in the wire grid polarization layer 102 are small enough as comparison with the wavelength of the incident light (specifically natural light), and the polarization direction of the polarized light is perpendicular to the extension direction of the slits. Therefore, the wire grid polarization layer 102 may have a function of lower polarizer of a liquid crystal display panel, and additionally arranging the lower polarizer is not needed, the structure of the liquid crystal display panel is simplified, and the thinning of the product may be realized. In a liquid crystal display device, the above-mentioned incident light is specifically provided by a backlight source. Moreover, the pitch of the slits of the wire grid polarization layer 102 is arranged between 80 nm to 150 nm (width/space=30:70%~70:30%, for example, pitch=120 nm, width is 36 nm-84 nm, space is 84 nm-36 nm), namely the pitch of the slits of the wire grid polarization layer 102 are small enough as comparison with the wavelength of the incident light, so that the incident light may form the polarized light after passing through the wire grid polarization layer 102. Materials of the metal wires in the wire grid polarization layer 102 may be metal such as Cu, Al, Ag, Mo, Cr, Nd, Ni, Mn, Ti, Ta and W and an alloy thereof, and metal layers where the metal wires are located may be of single-layer or multi-layer structures (such as Cu/Mo, Ti/Cu/Ti, Mo/Al/Mo).

Optionally, the above-mentioned array substrate provided by some embodiments of the present disclosure, as shown in FIG. 1 to FIG. 3, further includes a silicon dioxide layer 104 located between each of the metal wires and the transparent pattern 103; and an orthographic projection of the silicon dioxide layer 104 on the substrate 101 mutually overlaps with the orthographic projections of the metal wires on the substrate 101.

The silicon dioxide layer 104 is adopted as a mask, so that the etching selection ratio of a layer where the metal wires are located may be increased, and the wire grid polarization layer 102 with a relatively high depth-to-width ratio is obtained. Of course, during specific implementation, the silicon dioxide layer may not be arranged so as to simplify the fabrication process.

Optionally, the above-mentioned array substrate provided by some embodiments of the present disclosure further includes a transistor 105 located in a non-open region in the pixel region and an electrode structure 106 located at the side, away from the wire grid polarization layer 102, of a layer where the transparent pattern 103 is located.

As shown in FIG. 1 to FIG. 3, the wire grid polarization layer 102 is reused as a common electrode, and an electrode structure 106 is a pixel electrode electrically connected with a drain electrode of the transistor 105; it can be understood that wire grid polarization layers 102 in all pixel regions may be mutually independent from each other or electrically connected with each other under the condition that the wire grid polarization layers 102 are reused as the common electrode; when the metal wires of the wire grid polarization layer 102 are not electrically connected with other, the metal wires can reduce the resistance of the electrode structure 106 serving as the common electrode.

Alternatively, the wire grid polarization layer 102 is reused as a pixel electrode and is electrically connected with the drain electrode of the transistor 105, and the electrode structure 106 is a common electrode; optionally, the electrode structure 106 may be a slit electrode, in a working process, an electric field generated by the edge of the slit electrode in the same plane and an electric field generated between the electrode structure 106 and the wire grid polarization layer 102 form a multi-dimensional electric field, so that all liquid crystal molecules among the slit electrodes and right above the wire grid polarization layer 102 may deflect to realize a display mode of an ADS (Advanced Super Dimension Switch), so that the liquid crystal working efficiency is increased, the light transmittance is increased, the image quality of the product is improved, and the array substrate has the advantages such as high resolution rate, high transmittance, low power consumption, wide viewing angle, high aperture rate, low color difference and no extrusion water ripples.

In addition, in the array substrate provided by some embodiments of the present disclosure, the transistor 105 may be a bottom gate transistor as shown in FIG. 1 to FIG. 3; and the transistor 105 may also be a top gate transistor, the limitations thereof are omitted herein.

Optionally, when the transistor 105 in the above-mentioned array substrate provided by some embodiments of the present disclosure is of a bottom gate structure, as shown in FIG. 1 to FIG. 3, on the array substrate, a source electrode s and a drain electrode d are both located above an active layer a, a gate electrode g is located below the active layer a, a gate insulation layer 107 is arranged between the gate electrode g and the active layer a, and a passivation layer 108 is arranged above a layer where the source electrode s and the drain electrode d are located. The electrode structure 106 reused as the pixel electrode is located on the passivation layer 108 and is electrically connected with the drain electrode d in the transistor 105 via a via hole passing through the passivation layer 108.

Materials of the gate electrode g, the source electrode s and the drain electrode d may be metal such as Cu, Al, Ag, Mo, Cr, Nd, Ni, Mn, Ti, Ta and W and an alloy thereof, and a metal layer where the gate layer g is located and a metal layer where the source electrode s and the drain electrode d are located may be of single-layer or multi-layer structures (such as Cu/Mo, Ti/Cu/Ti, Mo/Al/Mo). Materials of the gate insulation layer 107 and the passivation layer 108 may be one of silicon oxide, silicon nitride and silicon oxynitride or a combination thereof, the limitations thereof are limited herein. A material of the active layer a may be a polycrystal silicon semiconductor material, an amorphous silicon semiconductor material, an oxide semiconductor material or an organic semiconductor material, and the limitations thereof are omitted herein.

Figure 4:
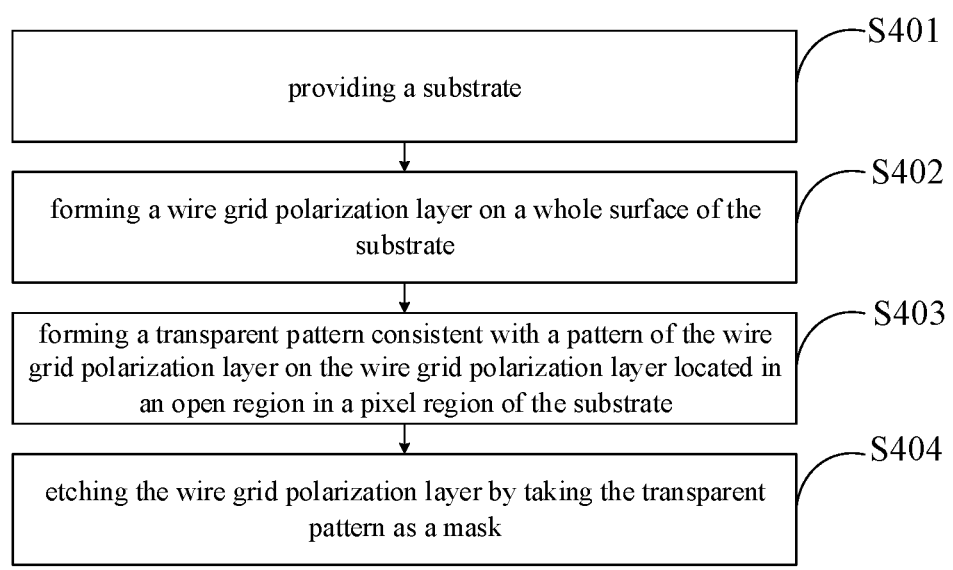
FIG. 4 is a flow diagram of a fabrication method of the array substrate, provided by an embodiment of the present disclosure.

Based on the same disclosure concept, some embodiments of the present disclosure further provide a fabrication method of the array substrate, as shown in FIG. 4, the fabrication method may specifically include the following steps:

S401, the substrate is provided;

S402, the wire grid polarization layer is formed on the whole surface of the substrate;

S403, the transparent pattern consistent with the pattern of the wire grid polarization layer is formed on the wire grid polarization layer located in the open region in the pixel region of the substrate; and S404, the wire grid polarization layer is etched by taking the transparent pattern as the mask.

In an actual fabrication process, the wire grid polarization layer is firstly fabricated on the whole surface, the wire grid polarization layer is masked by virtue of the transparent pattern located in the open region in the pixel region, and the wire grid polarization layer located in the open region in the pixel region is only retained, in this way, the align margin for performing the alignment process on the wire grid polarization layer is not required to be set, and therefore, the aperture rate of the liquid crystal display panel is increased.

Optionally, in the above-mentioned fabrication method provided by some embodiments of the present disclosure, the wire grid polarization layer is formed on the whole surface of the substrate in S402 may specifically include:

a metal layer and the silicon dioxide layer are sequentially deposited on the substrate 101, wherein the thickness of the metal layer may be 100 nm-300 nm, and the thickness of the silicon dioxide layer may be 50 nm-100 nm;

the silicon dioxide layer is coated with an imprinting adhesive;

the imprinting adhesive is subjected to nano-imprinting to form an imprint adhesive pattern;

the silicon dioxide layer is etched by taking the imprinting adhesive pattern as an etching mask to form a silicon dioxide pattern;

the metal layer is etched by taking the silicon dioxide pattern as an etching mask to form an intermediate pattern, wherein the intermediate pattern generally includes a metal wire grid structure and the silicon dioxide pattern remained on the metal wire grid structure; and the intermediate pattern is etched to remove the silicon dioxide pattern remained on the metal wire grid structure so as to fabricate the wire grid polarization layer and the silicon dioxide layer which have the same pattern.

In one possible implementation way, in the above-mentioned fabrication method provided by some embodiments of the present disclosure, the wire grid polarization layer includes the plurality of metal wires electrically connected with each other, and the slits are formed between the metal wires; and when executing the step S403 that the transparent pattern consistent with the pattern of the wire grid polarization layer is formed, the following step is further required to be executed:

the transparent structure covering the slits is formed, wherein the transparent structure and the transparent pattern are of the integrated structure arranged on the same layer.

In other words, the orthographic projection of the transparent pattern on the substrate mutually overlaps with the orthographic projections of the metal wires on the substrate, the orthographic projection of the transparent structure on the substrate mutually overlaps with the orthographic projections of the slits on the substrate, and the transparent pattern and the transparent structure are of the transparent layer located above the wire grid polarization layer.

Optionally, in the above-mentioned fabrication method provided by some embodiments of the present disclosure, the step that the transparent structure covering the slits is formed while the transparent pattern consistent with the pattern of the wire grid polarization layer is formed may specifically include:

the transparent material layer is formed on the whole surface of the wire grid polarization layer;

the transparent material layer in the open region in the pixel region is coated with a photoresist; and the transparent material layer is etched by taking the photoresist as a mask to form the transparent pattern with the orthographic projection being superimposed with each of the metal wires and the transparent structure covering each of the slits.

The material of the transparent material layer may be a transparent conducting material such as indium tin oxide and indium zinc oxide or any other transparent insulating material such as silicon oxide and silicon nitride, the limitations thereof are omitted herein.

Optionally, in the above-mentioned fabrication method provided by some embodiments of the present disclosure, the step that the transparent material layer is etched by taking the photoresist as the mask specifically includes:

the transparent material layer is etched by taking the photoresist as the mask and adopting a dry etching process.

Optionally, in the above-mentioned fabrication method provided by some embodiments of the present disclosure, the step that the wire grid polarization layer is etched by taking the transparent pattern as the mask may specifically include:

the wire grid polarization layer is etched by taking the photoresist above the transparent pattern and the transparent structure as the mask.

Optionally, in the above-mentioned fabrication method provided by some embodiments of the present disclosure, after the wire grid polarization layer is etched by taking the photoresist above the transparent pattern and the transparent structure as the mask, the following step is further required to be executed: the photoresist is stripped.

In another possible implementation way, in the above-mentioned fabrication method provided by some embodiments of the present disclosure, a wire grid polarization layer includes a plurality of metal wires electrically connected with each other, slits are formed between the metal wires, and when the step S403 that the transparent pattern consistent with the pattern of the wire grid polarization layer is formed is executed, the step may also be executed:

filler filling each of the slits is formed, wherein the filler and the transparent pattern are of an integrated structure.

In other words, an orthographic projection of the transparent pattern on the substrate mutually overlaps with orthographic projections of the metal wires on the substrate, the orthographic projections of the filler on the substrate are located in orthographic projections of the slits on the substrate 101.

Optionally, in the above-mentioned fabrication method provided by some embodiments of the present disclosure, the step that the filler filling each of the slits is formed while the transparent pattern consistent with the pattern of the wire grid polarization layer is formed may specifically include:

a transparent material layer covering each of the metal wires is formed, wherein gaps are formed between the transparent material layers in the same slits or the transparent material layers in the same slits are in contact with each other;

the transparent material layers in the open region in the pixel region is coated with a photoresist; and the transparent material layer are etched by taking the photoresist as a mask to form the transparent pattern with the orthographic projection being superimposed with each of the metal wires and the filler filling each of the slits, wherein each filler includes a first subsection in contact with the metal wire at one side of the slit where the filler is located, a second subsection in contact with the metal wire at the other side of the slit where the filler is located and a third subsection connecting the first subsection with the second subsection; gaps are formed between the first subsections and the second subsections; the third subsections are in contact with the substrate; or the slits are completely filled with the filler.

Optionally, in the above-mentioned fabrication method provided by some embodiments of the present disclosure, the step that the wire grid polarization layer is etched by taking the transparent pattern as the mask may specifically include:

the wire grid polarization layer is etched by taking the transparent pattern and the filler as masks.

Optionally, in the above-mentioned fabrication method provided by some embodiments of the present disclosure, before the wire grid polarization layer is etched by taking the transparent pattern and the filler as the masks, the following steps may also be executed:

the photoresist is subjected to stripping treatment; and the transparent pattern and the filler are subjected to annealing treatment, wherein in an annealing process, the transparent pattern composed of transparent materials such as indium tin oxide and the filler may be converted from an amorphous state to a polycrystal state, so that the phenomenon that the transparent pattern and the filler are etched in a subsequent process of etching the wire grid polarization layer 102 to affect the pattern of the finally formed polarization layer 102 is avoided.

Optionally, in the above-mentioned fabrication method provided by some embodiments of the present disclosure, the step that the transparent material layers are etched by taking the photoresist as the mask may specifically include:

the transparent material layers are etched by taking the photoresist as the mask and adopting a wet etching process.

It should be noted that, in the above-mentioned fabrication method provided by some embodiments of the present disclosure, a composition process related to the formation of each layer of structure in the above-mentioned fabrication method provided by some embodiments of the present disclosure not only may include parts or all of technical processes such as deposition, photoresist coating, mask masking, exposure, development, etching and photoresist stripping, but also may include other technical processes and is specifically based on a pattern of a required composition formed in an actual fabrication process, and the limitations thereof are omitted herein. For example, a postbaking process may also be included after development and before etching.

The deposition process may be a chemical vapor deposition method, a plasma enhanced chemical vapor deposition method or a physical vapor deposition method, and the limitations thereof are omitted herein; the mask used in a masking process may be a half tone mask, a single slit mask or a gray tone mask, and the limitations thereof are omitted herein; and etching may be dry etching or wet etching, and the limitations thereof are omitted herein.

In order to better understand the technical solution of the above-mentioned fabrication method provided by some embodiments of the present disclosure, the fabrication method will be described as below via the three possible embodiments.

Embodiment 1

Figure 5:
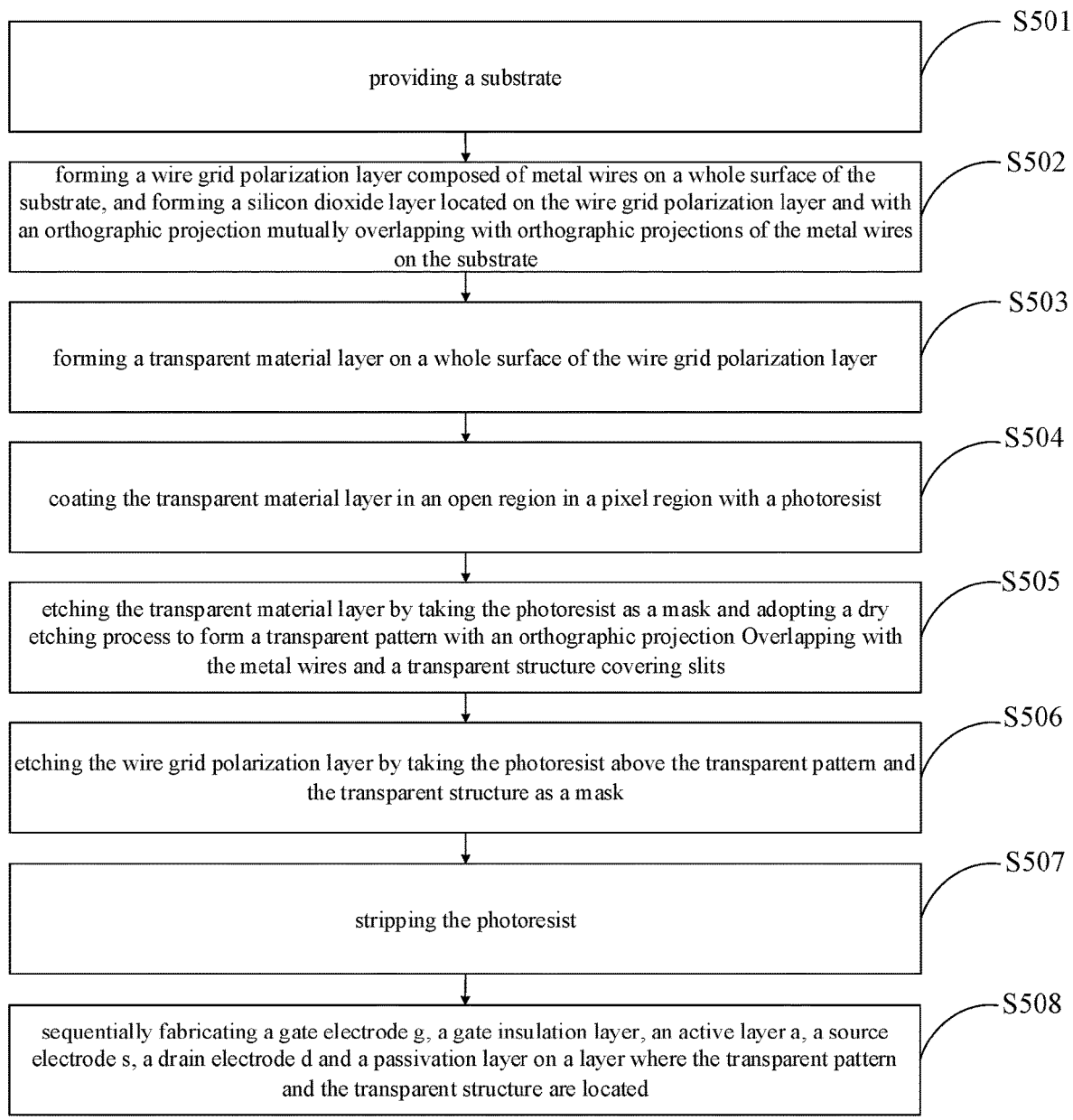
FIG. 5 is a first specific flow diagram of the fabrication method of the array substrate, provided by the embodiment of the present disclosure.
Figure 6:
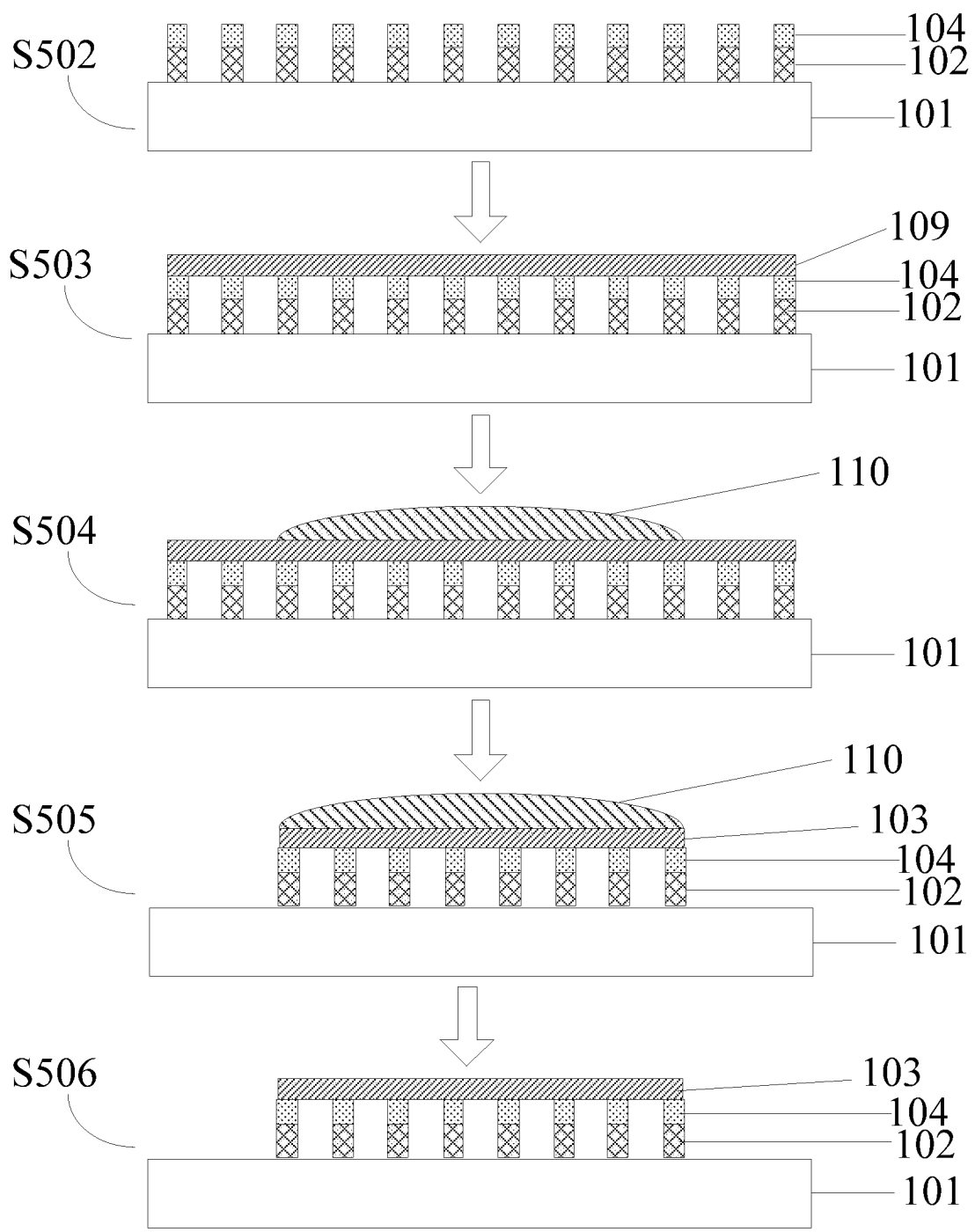
FIG. 6 is a schematic structural diagram corresponding to each step in a process of fabricating the array substrate as shown in FIG. 1 by adopting the fabrication method as shown in FIG. 5.

FIG. 5 and FIG. 6 specifically show a detailed process of a fabrication method provided by some embodiments 1 of the present disclosure and the schematic structural diagram of an array substrate corresponding to each step in a process of fabricating the array substrate as shown in FIG. 1 by adopting the method, and the method is specifically as follows.

Step S501, a substrate 101 is provided.

Step S502, a wire grid polarization layer 102 composed of a plurality of metal wires is formed on a whole surface of the substrate, and a silicon dioxide layer 104 located on the wire grid polarization layer 102 and with an orthographic projection being mutually superimposed with orthographic projections of the metal wires is formed on the substrate.

Optionally, the wire grid polarization layer 102 and the silicon dioxide layer 104 may be formed by adopting an NIL (Nano Imprinting Lithography) process; specifically, a metal layer and the silicon dioxide layer are sequentially deposited on the substrate 101; the silicon dioxide layer is coated with an imprinting adhesive; the imprinting adhesive is subjected to nano-imprinting to form an imprint adhesive pattern; the silicon dioxide layer is etched by taking the imprinting adhesive pattern as an etching mask to form a silicon dioxide pattern; the metal layer is etched by taking the silicon dioxide pattern as an etching mask to form an intermediate pattern, wherein the intermediate pattern generally includes a metal wire grid structure and the silicon dioxide pattern remained on the metal wire grid structure; and the intermediate pattern is etched to remove the silicon dioxide pattern remained on the metal wire grid structure so as to fabricate the wire grid polarization layer 102 and the silicon dioxide layer 104 which have the same pattern.

Step S503, a transparent material layer 109 is formed on a whole surface of the wire grid polarization layer 102.

Step S504, the transparent material layer 109 in an open region in a pixel region is coated with a photoresist 110.

Step S505, the transparent material layer 109 is etched by taking the photoresist 110 as a mask and adopting a dry etching process to form a transparent pattern 103 with an orthographic projection being superimposed with each of the metal wires and a transparent structure 103' covering each of slits.

Step S506, the wire grid polarization layer 102 is etched by taking the photoresist 110 above the transparent pattern 103 and the transparent structure 103' as the mask.

Step S507, the photoresist 110 is stripped.

Step S508, a gate electrode g, a gate insulation layer 107, an active layer a, a source electrode s, a drain electrode d and a passivation layer 108 are sequentially fabricated on a layer where the transparent pattern 103 and the transparent structure 103' are located. Film layers related to the step may be formed by adopting a conventional technical means, and the descriptions thereof are omitted herein.

Thus, the fabrication of the array substrate as shown in FIG. 1 is completed.

Seen from the above-mentioned description, in an actual fabrication process, the wire grid polarization layer is firstly fabricated on the whole surface, the wire grid polarization layer 102 is masked by virtue of the transparent material layer composed of the transparent pattern 103 and the transparent structure 103' located in the open region in the pixel region, and the wire grid polarization layer 102 located in the open region in the pixel region is only retained, in this way, an align margin for performing an alignment process on the wire grid polarization layer 102 is not required to be set, and therefore, the aperture rate of the liquid crystal display panel is increased.

Embodiment 2

Figure 7:
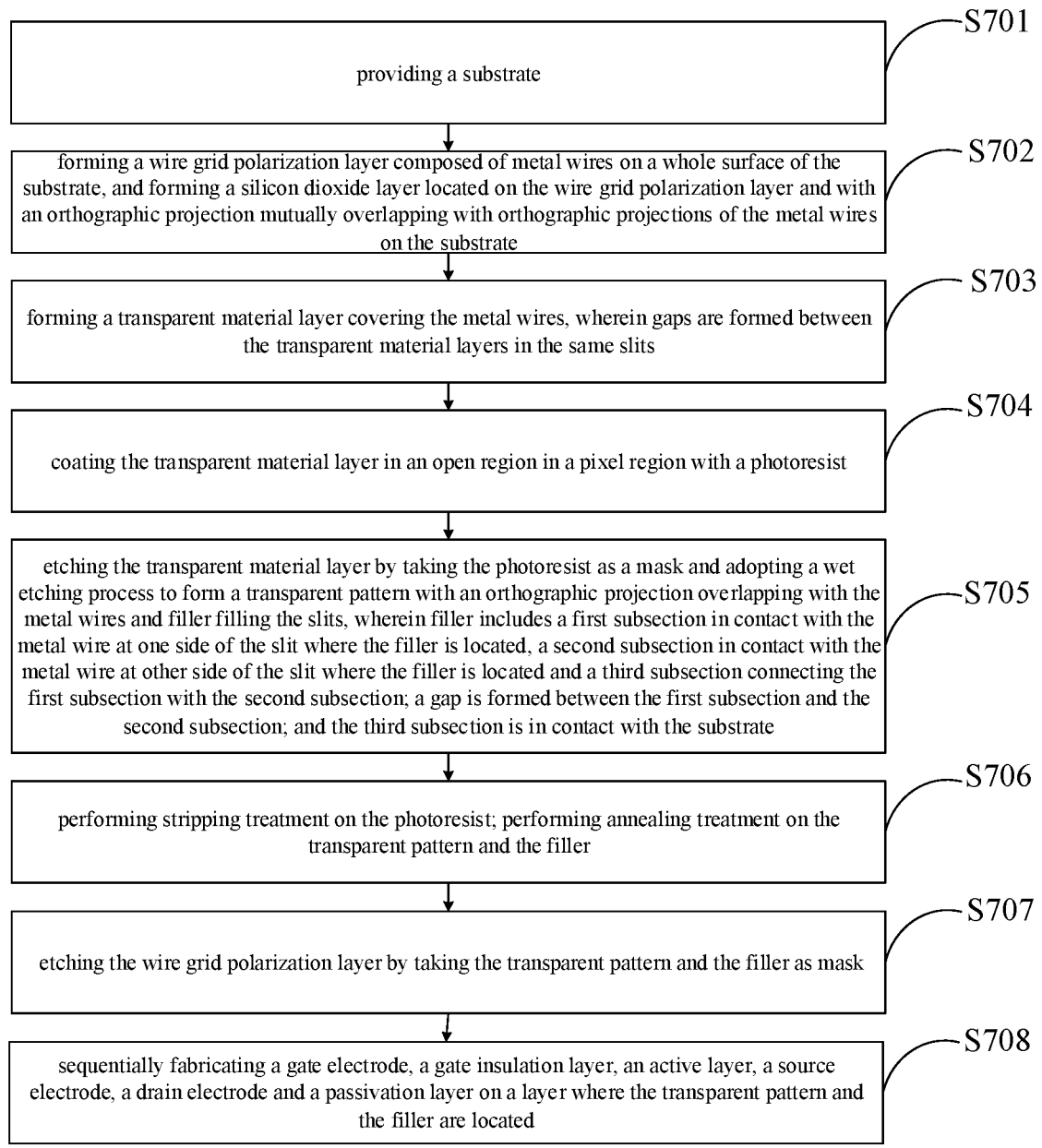
FIG. 7 is a second specific flow diagram of the fabrication method of the array substrate, provided by an embodiment of the present disclosure.
Figure 8:
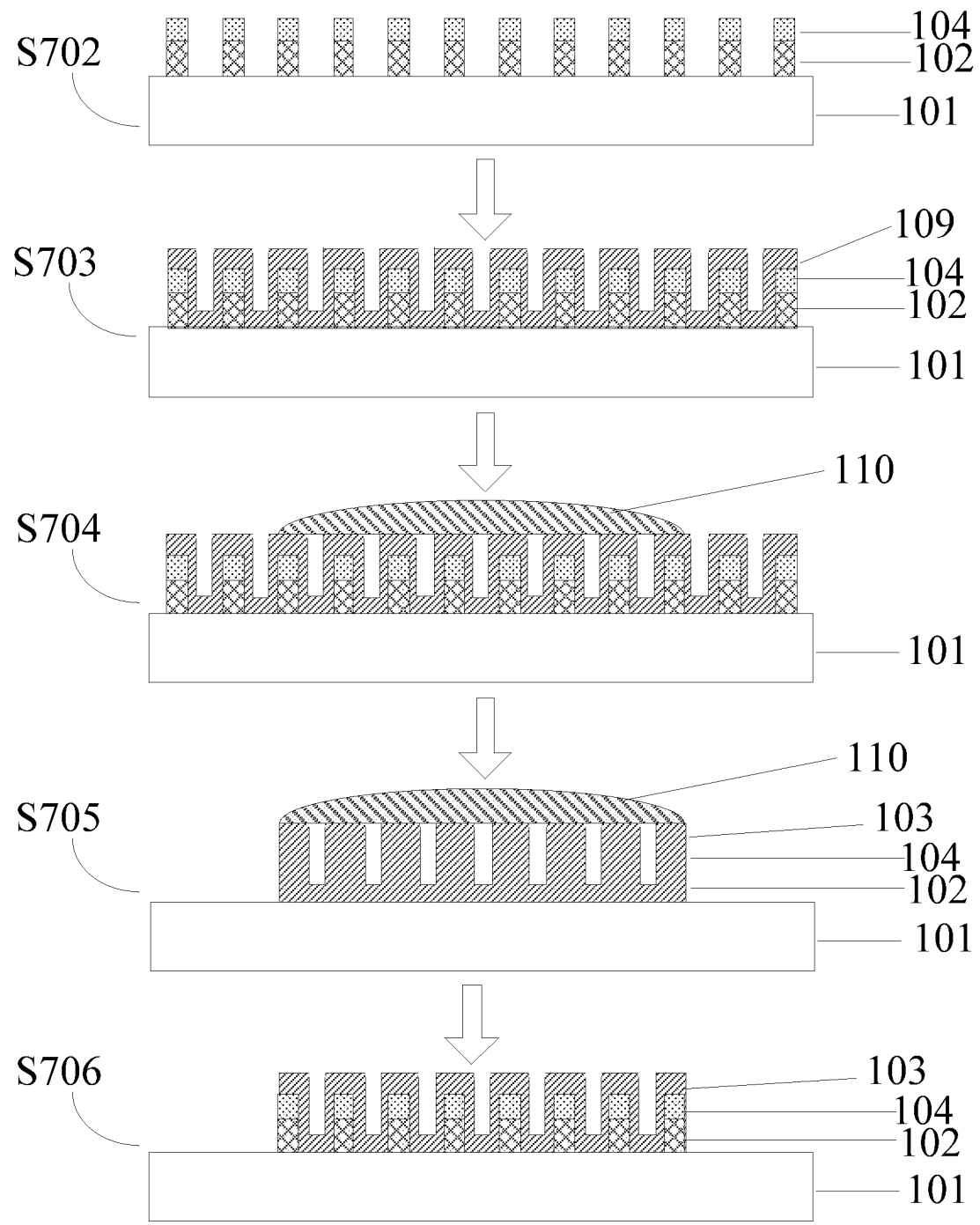
FIG. 8 is a schematic structural diagram corresponding to each step in a process of fabricating the array substrate as shown in FIG. 2 by adopting the fabrication method as shown in FIG. 7.

FIG. 7 and FIG. 8 specifically show a detailed process of a fabrication method provided by some embodiments 2 of the present disclosure and the schematic structural diagram of an array substrate corresponding to each step in a process of fabricating the array substrate as shown in FIG. 2 by adopting the method, and the method is specifically as follows.

Step S701, a substrate 101 is provided.

Step S702, a wire grid polarization layer 102 composed of a plurality of metal wires is formed on a whole surface of the substrate, and a silicon dioxide layer 104 located on the wire grid polarization layer 102 and with an orthographic projection being mutually superimposed with orthographic projections of the metal wires is formed on the substrate.

Optionally, the wire grid polarization layer 102 and the silicon dioxide layer 104 may be formed by adopting an NIL (Nano Imprinting Lithography) process; specifically, a metal layer and the silicon dioxide layer are sequentially deposited on the substrate 101; the silicon dioxide layer is coated with an imprinting adhesive; the imprinting adhesive is subjected to nano-imprinting to form an imprint adhesive pattern; the silicon dioxide layer is etched by taking the imprinting adhesive pattern as an etching mask to form a silicon dioxide pattern; the metal layer is etched by taking the silicon dioxide pattern as an etching mask to form an intermediate pattern, wherein the intermediate pattern generally includes a metal wire grid structure and the silicon dioxide pattern remained on the metal wire grid structure; and the intermediate pattern is etched to remove the silicon dioxide pattern remained on the metal wire grid structure so as to fabricate the wire grid polarization layer 102 and the silicon dioxide layer 104 which have the same pattern.

Step S703, a transparent material layer 109 covering each of the metal wires is formed, wherein gaps are formed between the transparent material layers 109 in the same slits.

Step S704, the transparent material layers 109 in an open region in a pixel region are coated with a photoresist 110.

Step S705, the transparent material layers 109 are etched by taking the photoresist 110 as a mask and adopting a wet etching process to form a transparent pattern 103 with an orthographic projection being superimposed with each of the metal wires and filler 103" filling each of the slits, wherein each filler 103" includes a first subsection in contact with the metal wire at one side of the slit where the filler is located, a second subsection in contact with the metal wire at the other side of the slit where the filler is located and a third subsection connecting the first subsection with the second subsection; gaps are formed between the first subsections and the second subsections; and the third subsections are in contact with the substrate 101.

Step S706, the photoresist 110 is subjected to stripping treatment; and the transparent pattern 103 and the filler 103" are subjected to annealing treatment. In an annealing process, the transparent pattern 103 composed of transparent materials such as indium tin oxide and the filler 103" may be converted from an amorphous state to a polycrystal state, so that the phenomenon that the transparent pattern 103 and the filler 103" are etched in a subsequent process of etching the wire grid polarization layer 102 to affect the pattern of the finally formed polarization layer 102 is avoided.

Step S707, the wire grid polarization layer 102 is etched by taking the transparent pattern 103 and the filler 103" as masks.

Step S708, a gate electrode g, a gate insulation layer 107, an active layer a, a source electrode s, a drain electrode d and a passivation layer 108 are sequentially fabricated on a layer where the transparent pattern 103 and the filler 103" are located. Film layers related to the step may be formed by adopting a conventional technical means, and the descriptions thereof are omitted herein.

Thus, the fabrication of the array substrate as shown in FIG. 2 is completed.

Seen from the above-mentioned description, in an actual fabrication process, the wire grid polarization layer is firstly fabricated on the whole surface, the wire grid polarization layer 102 is masked by virtue of the transparent material layers composed of the transparent pattern 103 and the filler 103" located in the open region in the pixel region, and the wire grid polarization layer 102 located in the open region in the pixel region is only retained, in this way, an align margin for performing an alignment process on the wire grid polarization layer 102 is not required to be set, and therefore, the aperture rate of the liquid crystal display panel is increased.

Embodiment 3

Figure 9:
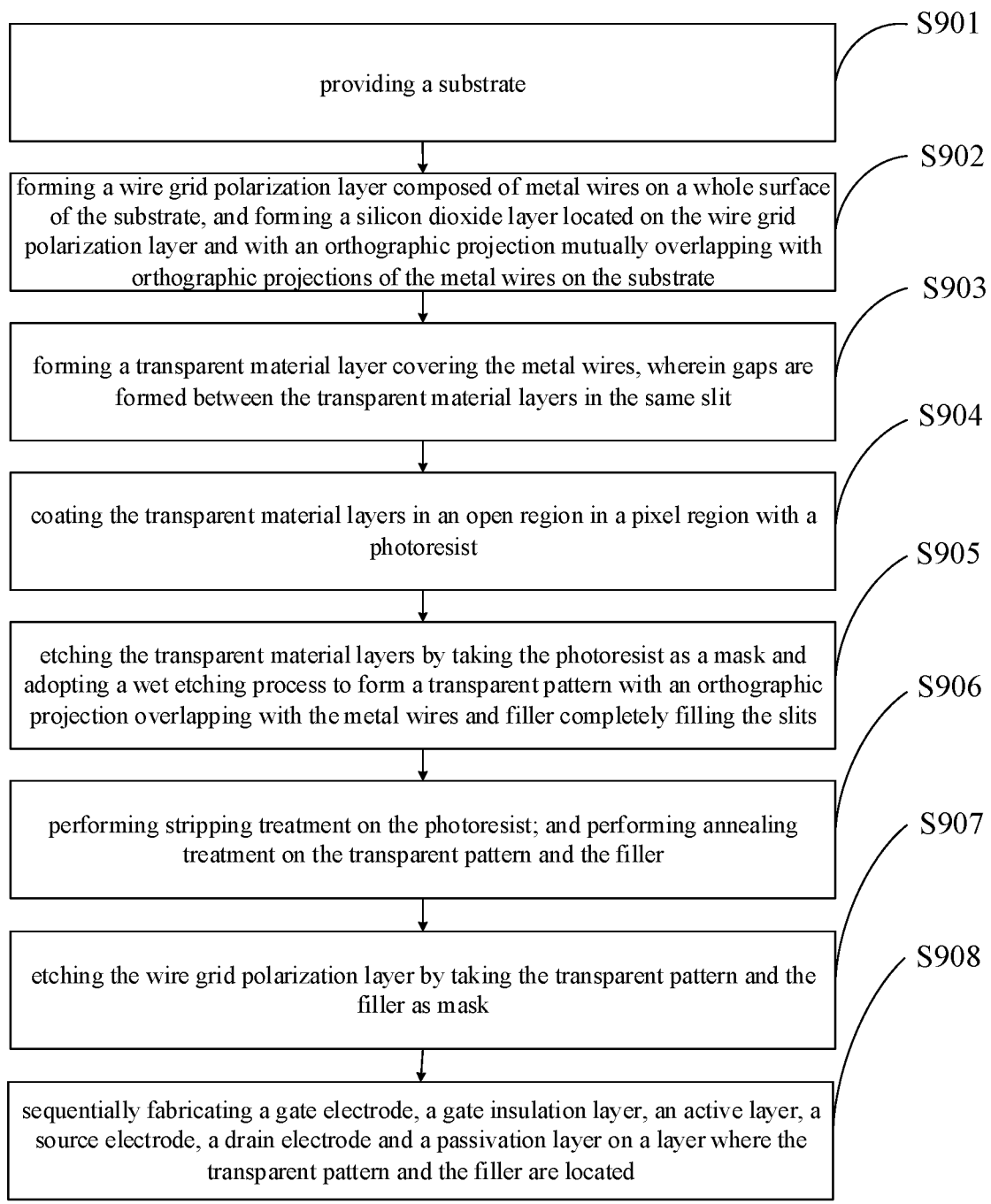
FIG. 9 is a third specific flow diagram of the fabrication method of the array substrate, provided by an embodiment of the present disclosure.
Figure 10:
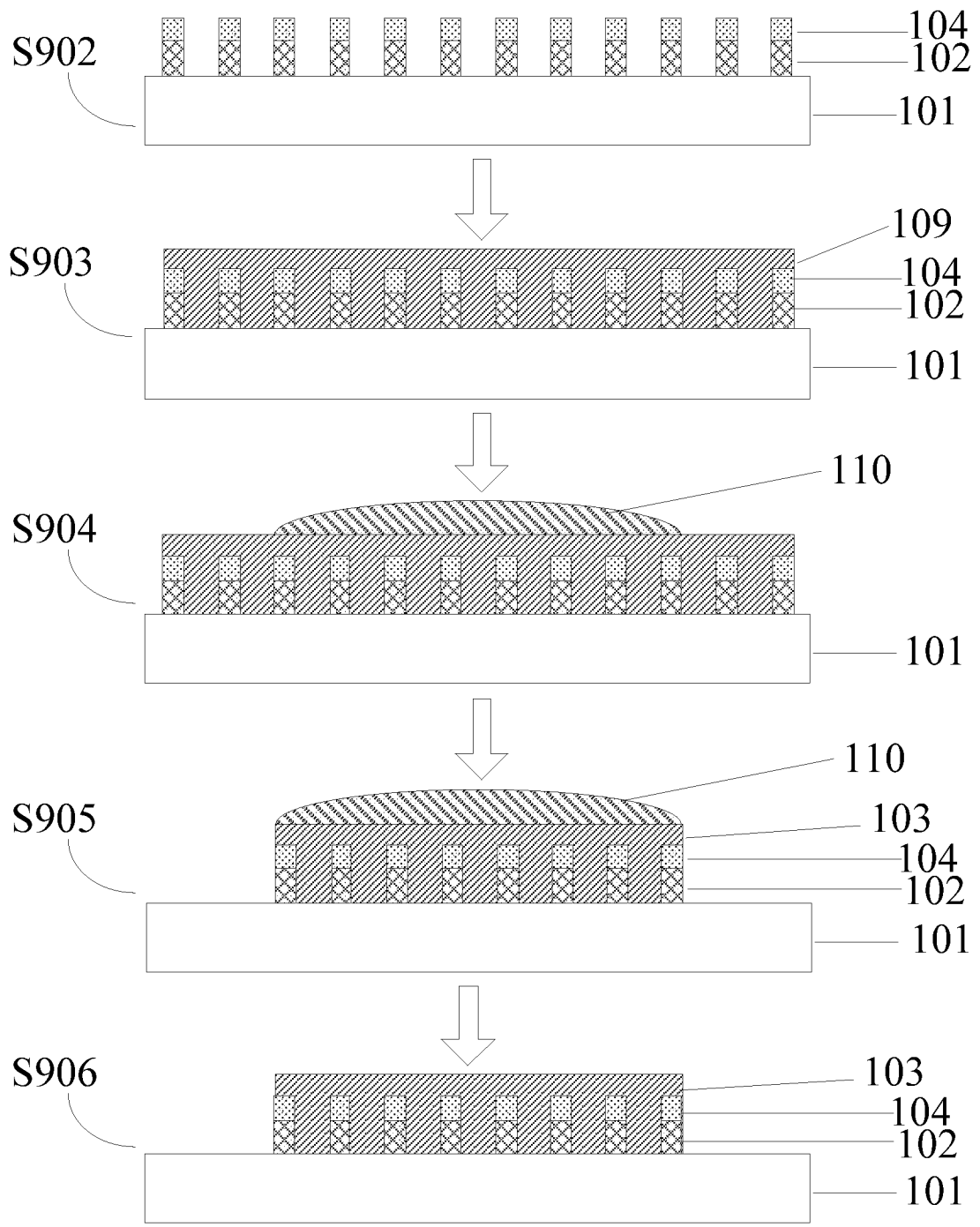
FIG. 10 is a schematic structural diagram corresponding to each step in a process of fabricating the array substrate as shown in FIG. 3 by adopting the fabrication method as shown in FIG. 9.

FIG. 9 and FIG. 10 specifically show a detailed process of a fabrication method provided by some embodiments 3 of the present disclosure and the schematic structural diagram of an array substrate corresponding to each step in a process of fabricating the array substrate as shown in FIG. 3 by adopting the method, and the method is specifically as follows.

Step S901, a substrate 101 is provided.

Step S902, a wire grid polarization layer 102 composed of a plurality of metal wires is formed on a whole surface of the substrate, and a silicon dioxide layer 104 located on the wire grid polarization layer 102 and with an orthographic projection being mutually superimposed with orthographic projections of the metal wires is formed on the substrate.

Optionally, the wire grid polarization layer 102 and the silicon dioxide layer 104 may be formed by adopting an NIL (Nano Imprinting Lithography) process; specifically, a metal layer and the silicon dioxide layer are sequentially deposited on the substrate 101; the silicon dioxide layer is coated with an imprinting adhesive; the imprinting adhesive is subjected to nano-imprinting to form an imprint adhesive pattern; the silicon dioxide layer is etched by taking the imprinting adhesive pattern as an etching mask to form a silicon dioxide pattern; the metal layer is etched by taking the silicon dioxide pattern as an etching mask to form an intermediate pattern, wherein the intermediate pattern generally includes a metal wire grid structure and the silicon dioxide pattern remained on the metal wire grid structure; and the intermediate pattern is etched to remove the silicon dioxide pattern remained on the metal wire grid structure so as to fabricate the wire grid polarization layer 102 and the silicon dioxide layer 104 which have the same pattern.

Step S903, a transparent material layer 109 covering each of the metal wires is formed, wherein gaps are formed between the transparent material layers 109 in the same slits.

Step S904, the transparent material layers 109 in an open region in a pixel region are coated with a photoresist 110.

Step S905, the transparent material layers 109 are etched by taking the photoresist 110 as a mask and adopting a wet etching process to form a transparent pattern 103 with an orthographic projection being superimposed with each of the metal wires and filler 103" completely filling each of the slits.

Step S906, the photoresist 110 is subjected to stripping treatment; and the transparent pattern 103 and the filler 103" are subjected to annealing treatment. In an annealing process, the transparent pattern 103 composed of transparent materials such as indium tin oxide and the filler 103" may be converted from an amorphous state to a polycrystal state, so that the phenomenon that the transparent pattern 103 and the filler 103" are etched in a subsequent process of etching the wire grid polarization layer 102 to affect the pattern of the finally formed polarization layer 102 is avoided.

Step S907, the wire grid polarization layer 102 is etched by taking the transparent pattern 103 and the filler 103" as masks.

Step S908, a gate electrode g, a gate insulation layer 107, an active layer a, a source electrode s, a drain electrode d and a passivation layer 108 are sequentially fabricated on a layer where the transparent pattern 103 and the filler 103" are located. Film layers related to the step may be formed by adopting a conventional technical means, and the descriptions thereof are omitted herein.

Thus, the fabrication of the array substrate as shown in FIG. 3 is completed.

Seen from the above-mentioned description, in an actual fabrication process, the wire grid polarization layer is firstly fabricated on the whole surface, the wire grid polarization layer 102 is masked by virtue of the transparent material layers composed of the transparent pattern 103 and the filler 103" located in the open region in the pixel region, and the wire grid polarization layer 102 located in the open region in the pixel region is only retained, in this way, an align margin for performing an alignment process on the wire grid polarization layer 102 is not required to be set, and therefore, the aperture rate of the liquid crystal display panel is increased.

It is worth noting that the thickness of the transparent material layers 109 may be regulated. Optionally, an integrated structure composed of the transparent pattern 103 and the transparent structure 103' in FIG. 1 may be formed when the thickness of the transparent material layers 109 is relatively small; and an integrated structure composed of the transparent pattern 103 and the filler 103" in FIG. 2 and FIG. 3 may be formed when the thickness of the transparent material layer 109 is relatively large.

Figure 11:
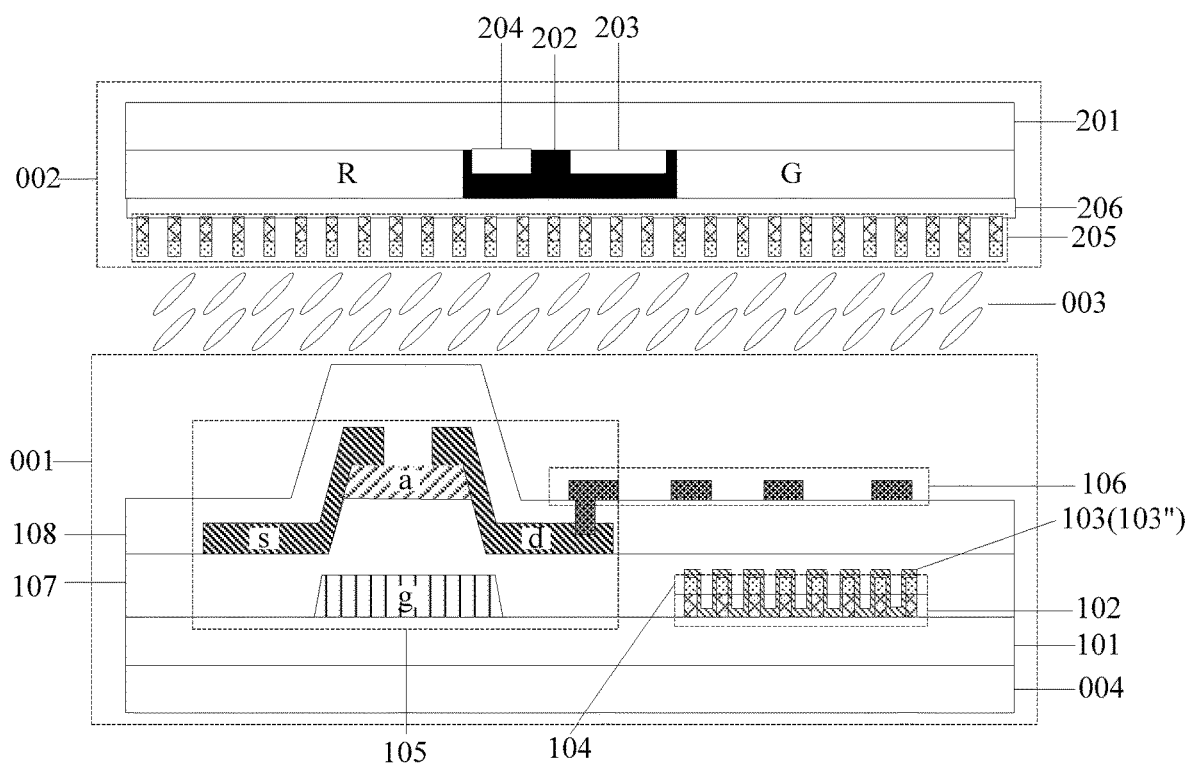
FIG. 11 is a schematic structural diagram of a liquid crystal display panel provided by an embodiment of the present disclosure.

Based on the same inventive concept, some embodiments of the present disclosure further provide a liquid crystal display panel, as shown in FIG. 11, including the array substrate 001 and an opposite substrate 002 arranged oppositely, a liquid crystal layer 003 located between the array substrate 001 and the opposite substrate 002 and a backlight source 004 located at the side, away from the opposite substrate 002, of the array substrate 001. The array substrate is the above-mentioned array substrate provided by some embodiments of the present disclosure. Of course, the backlight source 004 may also be a side-in-type backlight source, and the limitations thereof are omitted herein. The principle solving the problem of the liquid crystal display panel is similar to that of the above-mentioned array substrate, and therefore, the implementation of the liquid crystal display panel provided by some embodiments of the present disclosure may refer to that of the above-mentioned array substrate provided by some embodiments of the present disclosure, and the descriptions thereof are omitted herein. In addition, other components (such as a light guide plate) in the liquid crystal display panel publicly known by the skilled in the art are not introduced again herein.

Optionally, in the above-mentioned liquid crystal display panel provided by some embodiments of the present disclosure, as shown in FIG. 11, the opposite substrate 002 includes a first substrate 201, a black matrix 202 located on the substrate 201 and configured to limit a color barrier layer (a red color barrier R and a green color barrier G are specifically shown in the figure, and a blue color barrier B, a yellow color barrier Y, a white color barrier W and the like may also be included in actual application), a fingerprint recognition layer (PIN sensor) 203 and a reading line (RO line) 204 located between the black matrix 202 and the substrate 201 and covered by a pattern of the black matrix 202 as well as a first wire polarization layer 205 and an insulation layer (OC) 206 arranged on a whole surface. An extension direction of metal wires in the first wire polarization layer 205 is intersected with that of metal wires in the wire grid polarization layer 102 in the array substrate.

Based on the same inventive concept, some embodiments of the present disclosure further provides a display device including the above-mentioned liquid crystal display panel provided by some embodiments of the present disclosure, and the display device may be any one product or component with a display function, such as a mobile phone, a tablet personal computer, a television, a display, a notebook computer, a digital photo frame, a navigator, a smart watch, a wristband for fitness and a personal digital assistant. The principle solving the problem of the display device is similar to that of the above-mentioned liquid crystal display panel, and therefore, the implementation of the display device may refer to some embodiments of the above-mentioned liquid crystal display panel, and the descriptions thereof are omitted herein.

Some embodiments of the present disclosure provide the array substrate, the fabrication method thereof, the liquid crystal display panel and the display device. The array substrate includes the substrate, the wire grid polarization layer located in the open region in the pixel region of the substrate and the transparent pattern located at the side, away from the substrate, of the wire grid polarization layer and consistent with the pattern of the wire grid polarization layer. In the actual fabrication process, the wire grid polarization layer may be firstly fabricated on the whole surface, the wire grid polarization layer is masked by virtue of the transparent pattern, and the wire grid polarization layer located in the open region in the pixel region is only retained, in this way, an align margin for performing an alignment process on the wire grid polarization layer is not required to be set, and therefore, the aperture rate of the liquid crystal display panel is increased.

Obviously, various alterations and variations on the present disclosure can be made by the skilled in the art without departing from the spirit and scope of the present disclosure. In this way, if these alterations and variations of the present disclosure fall within the scopes of the claims and the equivalent technologies of the present disclosure, the present disclosure is also intended to include the alterations and variations.

The invention claimed is:

1. An array substrate, comprising a substrate, a wire grid polarization layer located in an open region in a pixel region of the substrate and a transparent pattern located at a side, away from the substrate, of the wire grid polarization layer and consistent with a pattern of the wire grid polarization layer;
    wherein the wire grid polarization layer comprises a plurality of metal wires, and slits are formed between the metal wires; and the array substrate further comprises:
    filler located in the slits, wherein the filler and the transparent pattern are of an integrated structure; a material of the filler is indium tin oxide or indium zinc oxide;
    wherein the filler comprises a first subsection in contact with a metal wire at one side of the slit where the filler is located, a second subsection in contact with a metal wire at the other side of the slit where the filler is located and a third subsection connecting the first subsection with the second subsection;
    a gap is formed between the first subsection and the second subsection; and
    the third subsection is in contact with the substrate.

2. The array substrate of claim 1, further comprising a silicon dioxide layer located between the metal wires and the transparent pattern; and
    an orthographic projection of the silicon dioxide layer on the substrate being mutually overlaps with orthographic projections of the metal wires on the substrate.

3. The array substrate of claim 1, further comprising a transistor located in a non-open region in the pixel region and an electrode structure located at a side, away from the wire grid polarization layer, of a layer where the transparent pattern is located;
    the wire grid polarization layer being reused as a common electrode, and the electrode structure being a pixel electrode electrically connected with a drain electrode of the transistor;
    or the wire grid polarization layer being reused as a pixel electrode and being electrically connected with the drain electrode of the transistor, and the electrode structure being a common electrode.

4. A fabrication method of an array substrate, comprising:
providing a substrate;
forming a wire grid polarization layer on a whole surface of the substrate;
forming a transparent pattern consistent with a pattern of the wire grid polarization layer on the wire grid polarization layer located in an open region in a pixel region of the substrate; and
etching the wire grid polarization layer by taking the transparent pattern as a mask;
wherein the wire grid polarization layer comprises a plurality of metal wires, and slits are formed between the metal wires, when forming the transparent pattern consistent with a pattern of the wire grid polarization layer, the method further comprises:
forming filler filling the slits, wherein the filler and the transparent pattern are of an integrated structure; a material of the filler is indium tin oxide or indium zinc oxide;
wherein the forming the filler filling the slits when forming the transparent pattern consistent with the pattern of the wire grid polarization layer comprises:
forming a transparent material layer covering the metal wires, wherein gaps are formed between the transparent material layers in a same slit or between the transparent material layers in a same slit are in contact with each other;
coating the transparent material layers in the open region in the pixel region with a photoresist; and
etching the transparent material layers by taking the photoresist as a mask to form the transparent pattern with an orthographic projection overlapping with the metal wires and the filler filling the slits, wherein
the filler comprises a first subsection in contact with the metal wire at one side of the slit where the filler is located, a second subsection in contact with the metal wire at other side of the slit where the filler is located and a third subsection connecting the first subsection with the second subsection; a gap is formed between the first subsection and the second subsection; the third subsection is in contact with the substrate.

5. The fabrication method of claim 4, wherein the etching the wire grid polarization layer by taking the transparent pattern as the mask comprises:
etching the wire grid polarization layer by taking the transparent pattern and the filler as masks.

6. The fabrication method of claim 5, wherein before etching the wire grid polarization layer by taking the transparent pattern and the filler as the masks, the method further comprises:
performing a stripping treatment on the photoresist; and
performing an annealing treatment on the transparent pattern and the filler.

7. The fabrication method of claim 4, wherein the etching the transparent material layers by taking the photoresist as the mask comprises:
etching the transparent material layers by taking the photoresist as the mask and adopting a wet etching process.

8. A liquid crystal display panel, comprising an array substrate and an opposite substrate arranged oppositely, wherein
the array substrate is the array substrate of claim 1.

9. A display device, comprising the liquid crystal display panel of claim 8.

10. An array substrate, comprising a substrate, a wire grid polarization layer located in an open region in a pixel region of the substrate and a transparent pattern located at a side, away from the substrate, of the wire grid polarization layer and consistent with a pattern of the wire grid polarization layer;
wherein the wire grid polarization layer comprises a plurality of metal wires, and slits are formed between the metal wires; and the array substrate further comprises:
filler located in the slits, wherein the filler and the transparent pattern are of an integrated structure; a material of the filler is indium tin oxide or indium zinc oxide;
wherein the filler comprises a first subsection in contact with a metal wire at one side of the slit where the filler is located, a second subsection in contact with a metal wire at the other side of the slit where the filler is located and a third subsection connecting the first subsection with the second subsection;
the third subsection is in contact with the substrate;
wherein the slits are completely filled with the filler.

* * * * *